United States Patent
Ross (10) Patent No.: US 10,007,520 B1
(45) Date of Patent: Jun. 26, 2018

(54) SYSTEMS AND METHODS FOR USING ALTERNATE COMPUTER INSTRUCTION SETS

(71) Applicant: JPMorgan Chase Bank, N.A., New York, NY (US)

(72) Inventor: Scott Ross, Dayton, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 223 days.

(21) Appl. No.: 15/053,194

(22) Filed: Feb. 25, 2016

(51) Int. Cl.
*G06F 9/30* (2018.01)

(52) U.S. Cl.
CPC .......... *G06F 9/3017* (2013.01); *G06F 9/3004* (2013.01)

(58) Field of Classification Search
None
See application file for complete search history.

(56) References Cited

U.S. PATENT DOCUMENTS

| | | | | |
|---|---|---|---|---|
| 5,740,461 A * | 4/1998 | Jaggar | ................. | G06F 9/30174 712/209 |
| 5,774,686 A * | 6/1998 | Hammond | .......... | G06F 9/30181 712/209 |
| 6,427,202 B1 * | 7/2002 | Richardson | ......... | G06F 9/30145 712/248 |
| 7,149,878 B1 * | 12/2006 | Jensen | ................ | G06F 9/30076 712/209 |
| 9,015,680 B1 * | 4/2015 | Shropshire | .......... | G06F 11/3624 717/126 |
| 2004/0034851 A1 * | 2/2004 | Ungar | ....................... | G06F 8/53 717/136 |
| 2009/0172713 A1 * | 7/2009 | Kim | .................... | G06F 9/30145 719/331 |

* cited by examiner

*Primary Examiner* — Eric Coleman
(74) *Attorney, Agent, or Firm* — Hunton Andrews Kurth LLP (57) ABSTRACT

Systems and methods for using alternate computer instruction sets are disclosed. In one embodiment, a method of program execution using an alternate instruction set may include (1) enabling a computer processor to use an alternate instruction set; (2) a first computer program in memory issuing a first instruction for execution by the computer processor; (3) the computer processor determining that the first instruction issued by the first computer program is in the alternate instruction set; (4) the computer processor translating the first instruction issued by the first computer program; and (5) the computer processor executing the translated instruction.

20 Claims, 4 Drawing Sheets

Mapping
instruction opcode: START = 0
instruction opcode: END = 6309449
instruction opcode: LENGTH = 64
instruction opcode: ENCODING = bigendian
instruction opcode: BREAKONUNKNOWN = true
instruction opcode: BREAKONUNKNOWN = false
instruction opcode: 000FFFFF7F0022FC = load
instruction opcode: 000FFFFF7F00FFFC = add
instruction opcode: 0000000000000000 = add
instruction opcode: FFFFFFFFFFFFFFFF = add
instruction opcode: 007F00FFFC000000 = sub
instruction opcode: 000FFFDDDD022000 = noop
instruction opcode: 00000DDDD0220000 = noop
instruction opcode: 000FFFDDDD000002 = store
instruction opcode: 000FFFDDDD000004 = stop
decoding instruction
first instruction 000FFFFF7F00FFFC
first instruction add Decoding instruction
opcode add data 002200 location 16
decoding next instruction 007F00FFFC000000 (35748421486772224) sub location 38
opcode subtract data 000000 location 38
decoding next instruction 000FFF007F0000FC (4502502246449404) unknown location 60
unknown instruction 000FFF007F0000FC
decoding next instruction 00000DDDD0220000 (15246330822656) noop location 76
opcode noop  location 76
decoding next instruction 000FFFDDDD000002 (4503453011279874) store location 92
opcode store data 123456789000000089 location 92
decoding next instruction FFFFFFFFFFFFFFFF (18446744073709551615) add location 126
opcode add data 123344 location 126
decoding next instruction 0000000000000000 (0) add location 148
opcode add data 123344 location 148

FIG. 3

Mapping
instruction opcode: START = 0
instruction opcode: END = 6309449
instruction opcode: LENGTH = 64
instruction opcode: ENCODING = bigendian
instruction opcode: BREAKONUNKNOWN = true
instruction opcode: 000FFFFF7F0022FC = load
instruction opcode: 000FFFFF7F00FFFC = add
instruction opcode: 0000000000000000 = add
instruction opcode: FFFFFFFFFFFFFFFF = add
instruction opcode: 007F00FFFC000000 = sub
instruction opcode: 000FFFDDDD022000 = noop
instruction opcode: 00000DDDD0220000 = noop
instruction opcode: 000FFFDDDD000002 = store
instruction opcode: 000FFFDDDD000004 = stop Decoding instruction
first instruction 000FFFFF7F00FFFC
first instruction add
decoding instruction
opcode add data 002200 location 16
decoding next instruction 007F00FFFC000000 (35748421486772224) sub location 38
opcode subtract data 000000 location 38
decoding next instruction 000FFF007F0000FC (4502502246449404) unknown location 60
unknown instruction 000FFF007F0000FC
Exception Unknown Instruction

FIG. 4

SYSTEMS AND METHODS FOR USING ALTERNATE COMPUTER INSTRUCTION SETS

BACKGROUND OF THE INVENTION

1. Field of the Invention

The present invention generally relates to systems and methods for using alternate computer instruction sets.

2. Description of the Related Art

An instruction set is a part of the computer architecture. In general, an instruction set is related to programming, and includes native data types, instructions, registers, addressing modes, processor modes, user modes, CPU status, memory architecture, interrupt and exception handling, and external input/output. An instruction set includes a specification of the set of opcodes (machine language), and the native commands implemented by a particular processor.

SUMMARY OF THE INVENTION

Systems and methods for using alternate computer instruction sets are disclosed. In one embodiment, a method of program execution using an alternate instruction set may include (1) enabling a computer processor to use an alternate instruction set; (2) a first computer program in memory issuing a first instruction for execution by the computer processor; (3) the computer processor determining that the first instruction issued by the first computer program is in the alternate instruction set; (4) the computer processor translating the first instruction issued by the first computer program; and (5) the computer processor executing the translated instruction.

In one embodiment, a binary machine code disassembler may disassembles the alternate instruction into assembly code, and the translated instruction comprises the assembly code. The binary machine code disassembler may use a configuration or translator.

In one embodiment, the step of enabling a computer processor to use an alternate instruction set may include an operating system bootloader loading the alternate instruction set to a memory. In one embodiment, the memory may be internal to the computer processor.

In one embodiment, a translation look-aside buffer may translate the first instruction issued by the first computer program.

In one embodiment, the alternate instruction set may include instructions having a different format from a standard instruction for the computer processor.

In one embodiment, the alternate instruction set instruction may be executed in a different processor mode than a standard instruction for the computer processor.

In one embodiment, the alternate instruction set instruction may be executed in a different address mode than a standard instruction for the computer processor.

In one embodiment, the alternate instruction set may include a mapping between alternate instructions and standard instructions for the computer processor.

In one embodiment, the computer processor may compile the first computer program for the alternate instruction set.

In one embodiment, the method may further include a second computer program in memory issuing a second instruction for execution by the computer processor; the computer processor determining that the second instruction issued by the computer program is not in the alternate instruction set; and the computer processor preventing the second instruction from executing.

In one embodiment, the computer processor may execute a no operation in response to the second instruction not being in the alternate instruction set.

In one embodiment, the computer processor may generate an exception in response to the second instruction not being in the alternate instruction set.

In one embodiment, the computer processor may restart the computer in response to the second instruction not being in the alternate instruction set.

In another embodiment, a method for program execution using an alternate instruction set may include (1) enabling a computer processor to use an alternate instruction set; (2) a computer program in memory issuing an instruction for execution by the computer processor; (3) the computer processor determining that the instruction issued by the computer program is not in the alternate instruction set; and (4) the computer processor preventing the instruction from executing.

In one embodiment, the computer processor may execute a no operation in response to the second instruction not being in the alternate instruction set.

In one embodiment, the computer processor may generate an exception in response to the second instruction not being in the alternate instruction set.

In one embodiment, the computer processor may cause a computer associated with the computer processor to restart in response to the second instruction not being in the alternate instruction set.

In one embodiment, the computer processor may enable a second alternate instruction set in response to the second instruction not being in the alternate instruction set.

In one embodiment, the computer processor may change a computer processor mode in response to the second instruction not being in the alternate instruction set.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-4.

Embodiments disclosed herein relate to systems and methods for using an alternate computer instruction set are disclosed.

According to embodiments, the use of an alternate instruction set provides security against computer viruses by changing the CPU's instruction set assignments. Thus, a virus or other program that does not know (or cannot predict) the CPU instruction set assignment will issue instructions that have little or no impact or meaning, or may be prevented from executing.

The alternate instruction set may be used with existing computer processors as well was custom computer processors, application specific integrated circuits, graphics processors, co-processors, Very Long Instruction Word (VLIW) processors, embedded processors, Field Programmable Gate Arrays (FPGAs), interrupt controllers, etc.

Any size instruction code may be used; in embodiments, a 64-bit or 128-bit or larger instruction code may be used.

In embodiments, instructions may be assigned multiple times with several different codes for additional obfuscation.

In embodiments, the instruction code may be translated into different formats.

In embodiments, alternate instruction set boot loaders may be used during computer startup.

In embodiments, the alternate instruction set may be used with a virtual machine.

In embodiments, a uniform instruction set with flexible encoding may be used. Flexible encoding refers to a CPU or microprocessor instruction set format that can be randomized and changed or contain variable length opcodes or attributes that can be assigned and compiled to machine code and executed programmatically. Instructions can be assigned to alternate instructions having alternate and/or randomized numeric opcodes.

A fixed CPU or processor encoding instruction set means that the processor opcodes are predefined and provide no capability for change or administration. Hardware specific registers for alternate instruction set status and CPU state information and the format may be enhanced with CPU hardware.

In embodiments, computer administrators may enable, disable, alter, load, etc. the alternate instruction set code on a computer.

In embodiments, binary machine code may be used to further obfuscation the instruction set.

In embodiments, each CPU instruction, CPU instruction code, etc. may be assigned an alternate or random number and a corresponding instruction type as well as an alternate instruction set group number. This may alter the binary instruction set at the CPU level to make the operating system much harder to attack at the CPU level or the operating system level. For example, an attacker would have to choose between 18,446,744,073,709,551,616 numbers in a 64-bit opcode (or larger) to guess the alternate instruction set assignments. In addition, if there is an alternate instruction set assignment code, the attacker would have to guess that first (e.g., whether the instruction set is in alternate instruction set 200).

In embodiments, an architect can create a computer microprocessor CPU that has a binary translation layer that maps from an alternate instruction set to an internally assigned CPU instruction set, such as MIPS, ARM, x86, RISC, CISC, VLIW instruction sets (e.g., Itanium), FGPA instruction set, embedded processor instruction set, multi-core processor instruction set, etc.

In embodiments, a CPU may change or alter the instruction assignment or reassign an instruction set. In one embodiment, the alternate instruction set mapping, look-up table, etc. may be internal to the CPU which makes it harder for an application to attack the operating system. In embodiments, a CPU may support both an alternate instruction set and a fixed standard instruction set (e.g., a public standard industry defined machine code instruction format or architecture).

In embodiments, an alternate instruction set address mode and/or processor mode may be used for a CPU. For example, the processor mode or address mode may be changed from a fixed instruction format set to a randomized alternate instruction set format. A CPU may be run in fixed mode or non-fixed instruction address or processor mode. The CPU may switch address modes to enable or disable the alternate instruction set, and security features may be provided.

In one embodiment, a CPU may have a fixed processor instruction set processor mode and address mode, an alternate instruction set processor mode and address mode, or a combined mode. The CPU may specify virtual machine address spaces that correspond with different alternate instruction set lists with the translation lookaside buffer (TLB).

In one embodiment, a CPU may also contain a set instruction set, and instructions to change to a different instruction set or only run with a specified instruction alternate instruction set. A CPU instruction may be provided to switch to a different numeric delineated instruction set list (e.g., it can also be assigned a random opcode). A processor architecture may force programs to specify which alternate instruction set number they will run under in addition to having 32-bit to 64-bit or larger instruction set op codes.

In embodiments, a CPU may use the translation lookaside buffer (TLB) to map between the alternate instruction set and the CPU's internal instruction set. The mapping or look-up table may be encapsulated internally within a CPU. For example, the mapping/look-up table may be stored in flash memory, non-volatile memory, read-only memory, dynamic memory, virtual memory, with file and files system storage or disk storage memory mapping, etc. In one embodiment, the mapping/look-up table may also be stored in a remotely managed database, on a remote server and downloaded at startup, etc.

In embodiments, an alternate or randomized instruction set code list may be assigned to each CPU. The CPU may also be assigned a different instruction set encoding by, for example, an administrator. The OS may then exploit the alternate or randomized instruction set by compiling to the alternate or randomized instruction set.

There may also be multiple alternate instruction sets running concurrently on the same CPU.

The alternate instruction set opcode may be any suitable length, such as 32-bits, 64-bits, 128-bits, etc. It may also be of a variable length, and may include multiple randomized No OP instructions for padding. It may also add additional parameters, such as per instruction endian ness. For example, high byte order or low bye order encoding for the instruction opcode or shift order where the instructions opcode or opcode operands are shuffled and unshuffled within the processor prior to instruction map number assignment. It may assign an instruction operation type (e.g. assigning an add or divide to the instruction. It may also contain an instruction to switch the instruction encoding during execution between multiple encodings.

In one embodiment, the alternate instruction set may also include multiple instruction code assignments that may be assigned at compile time or computer load time. This assignment may be random. The CPU may also have an alternate application instruction set and an OS instruction set.

In embodiments, the alternate instruction code may be a prefixed random 32 to 128+ or larger op code bit number. The code may be Big Endian, Little Indian, Shift Order (e.g., wherein the opcode bits are bytes can be shifted to a corresponding number internally in the CPU), Variable length N-Bit (32 to 128-bit or larger), etc.

In embodiments, the alternate instruction set format may be programmatically altered in the CPU and may use incomplete assignments to assign partial CPU instruction sets. For example, the alternate instruction lists may include different instruction set lists of CPU opcode assignments. Thus, a full instruction set or partial instruction set may be assigned. For example, if an instruction set contains 100 CPU instructions, a user may assign only 50 of them to a corresponding alternate instruction set.

In one embodiment, a binary machine code disassembler for alternate variable format instruction sets may use a configuration or translator to disassemble alternate instruction code formats into the assembly code for the CPU.

Alternate instruction sets may be like processor namespaces under which instruction sets can be assigned with an associated number to differentiate them. For example, alternate instruction set 100 may contains add, subtract, multiply, etc. while alternate instruction set 200 may contain no instructions. As another example, an alternate instruction set instruction may assign adds to an alternate instruction set list.

Figure 1:
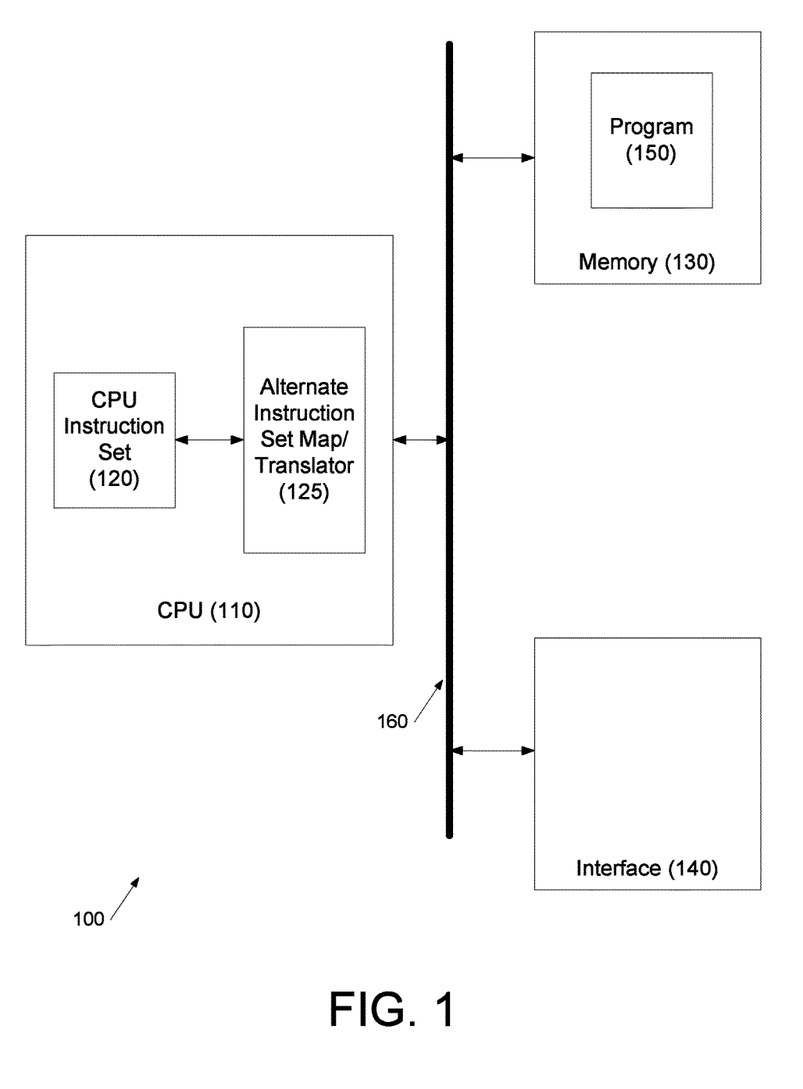
FIG. 1 depicts a system for using an alternate computer instruction set according to one embodiment.

Referring to FIG. 1, a system for using an alternate instruction set is disclosed. System 100 may include CPU 110, memory 130, and interface 140. CPU 110 may include a CPU instruction set 120 and alternate instruction set map/translator 125. CPU instruction set 120 may be any suitable instruction set, including, for example, MIPS, ARM, x86, RISC, CISC, VLIW instruction sets (e.g., Itanium), FGPA instructions, embedded processor instructions, multicore processor instructions, etc.

Alternate instruction set map/translator 125 may include a mapping of alternate instruction set opcodes to the CPU instruction set. Thus, when CPU 110 receives an instruction from, for example, program 150, CPU 110 may retrieve the corresponding CPU instruction to be executed by the CPU.

In another embodiment, alternate instruction set map/translator 125 may perform a function to translate the incoming instruction from program 150 into the CPU instruction.

In one embodiment, the alternate instruction opcode parameter may have a fixed length, a variable length, etc. In another embodiment, numbers may be subtracted or multiplied internally to map to a different instruction set opcode number. In another embodiment, the opcode's instruction assignment may be preselected by a computer user, an administrator, or generated by a hardware number random generator. In still another embodiment, the alternate instruction set map may be generated by a program that may randomly assign the instruction set parameters that is compatible with the alternate instruction set or an alternative format. In yet another embodiment, the alternate instruction set opcode format could involve programmatic computation variables within the map translator.

In one embodiment, alternate instruction set map/translator 125 may be stored in flash memory, non-volatile memory, etc. The translation look-aside buffer may translate incoming alternate instructions into CPU instructions using alternate instruction set map/translator 125.

In one embodiment, alternate instruction set map/translator 125 may be stored in memory 130 (not shown).

In one embodiment, alternate instruction set map/translator 125 may be loaded by a bootloader as part of startup. In another embodiment, alternate instruction set map/translator 125 may be loaded on startup in the firmware initialization. In one embodiment, a bootloader may use one instruction set to randomize the instruction code for the bootloader, and then switch to a different instruction set for the operating system. In one embodiment, the bootloader may assign the alternate instruction set to an alternate instruction set group number list. Thus, the bootloader may assign the instruction set for program runtime at operating system load time where it is loaded into memory and before startup execution and specifies the operating system execution instruction assignment.

Program 150 may be stored in memory 130, and may be executed by CPU 110. In one embodiment, program 150 may be compiled to the selected alternate instruction set.

Interface 140 may allow a user, an administrator, etc. to interface with CPU 110 and/or alternate instruction set map/translator 125. In one embodiment, interface 140 may be for a specific CPU; in another embodiment, it may interface with more than one CPU (e.g., over network). In one embodiment, interface 140 may permit the user to update alternate instruction set map/translator 125, upload a replacement alternate instruction set map/translator 125, enable/disable alternate instruction set map/translator 125, interface with program 150, etc. In one embodiment, interface 140 may be used to assign the alternate instruction set to an alternate instruction set group number list or unassign it from a list, change the instruction set to a particular variation from a list of valid instruction set, download the alternate instruction set list from a remove server, administer the alternate instruction set list, etc.

CPU 110, memory 130, interface 140, and other peripherals (not shown) may communicate using one or more bus 160.

In one embodiment, the alternate instruction set may provide a "CPU ID" or product code (e.g., an SKU) assignment to allow for the association of a processor with a particular alternate instruction set assignment. This may be particularly useful with embedded systems or computer systems, such as router firmware, where the assignment could change between hardware and the firmware on each machine and could utilize a different alternate instruction set. The alternate instruction set may be mapped to the CPU ID or device product code (e.g., SKU).

In another embodiment, the alternate instruction set may be associated with a unique identifier.

In another embodiment, the alternate instruction set object code file may start with a random amount of data at the start or end of the code, such as n-bytes, which can be ignored by the operating system or CPU to make the starting position of the code harder to locate.

In still another embodiment, lists of alternate instruction sets corresponding to different machines may be stored and managed.

In one embodiment, a computer program may be compiled with a fat binary with multiple instruction set code paths for a computer to switch to. A fat binary or universal binary would allow for a computer to randomly select between 10 or more different alternate instruction set instruction formats at boot time.

Figure 2:
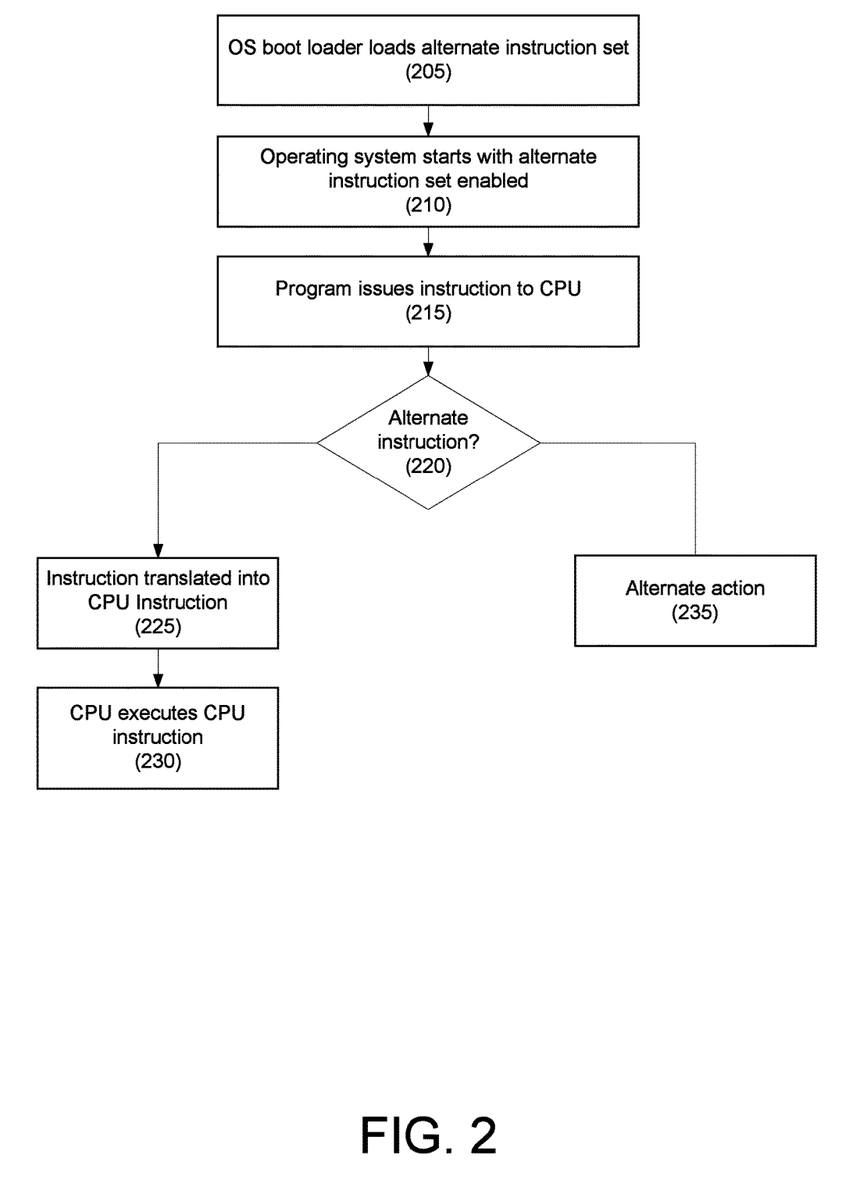
FIG. 2 depicts a method for using an alternate computer instruction set according to one embodiment.

Referring to FIG. 2, a method for program execution using an alternate instruction set map according to one embodiment is disclosed.

In step 205, the operating system (OS) bootloader may load the alternate instruction set. In one embodiment, a bootloader or firmware initialization may precede the OS and load the map or initialize the alternate instruction set format. In another embodiment, the CPU may start with an alternate instruction set (e.g., predefined or hardcoded). The CPU may then load a map/look-up table into memory or a Translation Look Aside Buffer with virtual machine mapping and per virtual machine alternate instruction set code. In another embodiment, the CPU may load the alternate instruction set mapping/table into a cache or memory area that the operating system cannot access. The alternate instruction set map/table may be loaded before the operating system during startup and possibly before the boot loader at firmware initialization.

In one embodiment, the alternate instruction set map/table may be loaded within the CPU from, for example, external rom, flash memory, etc.\

In one embodiment, the CPU, the user, or an administrator may select the alternate instruction set to use, or may define the encoding of the instructions.

In step 210, if not already enabled, the alternate instruction set may be enabled. In one embodiment, this may be part of the start-up process for the CPU; in another embodiment, it may performed on-demand by, for example, a user, an administrator, etc. In another embodiment, it may occur automatically when a virus threat is present. In another embodiment, it may be activated when the computer is connected to an external network.

In one embodiment, a user or administrator may enable, disable, update, administer, load, or change the alternate instruction set. In one embodiment, the CPU may be updated to use a new instruction format, address mode, and/or processor mode.

In step 215, a program in memory may issue an instruction to the CPU. In one embodiment, the program may be compiled for, or be aware of, the alternate instruction set may be executed by the CPU. In one embodiment, a language compiler or assembly compiler may compile the code to the alternate instruction set that is being used by utilizing a translation map to the corresponding instruction set opcode assignment translation map of the alternate instruction set. The CPU may then translate the opcodes to the instruction type. During compiling, the objects code may be mapped to the alternate instruction set and then computer object code is generated.

In another embodiment, a compiler may compile the code to a standard or fixed instruction format that can be translated into other instruction formats instead of recompiling. This alternate instruction translation compile mapping may be restricted and stored remotely from a computer or managed centrally to prevent or control object code from being generated.

In one embodiment, the compiler may need to be aware of the instruction set opcode assignment format attributes and the op code encoding length (e.g., from n-bits to 32 to 128 bits or larger) and the alternate instruction set assignments. It may also need to know whether the instructions are big or little endian or shift order and possibly the instruction set list number.

In one embodiment, a computer debugger may also utilize the alternate instruction set map/table to debug alternate instruction set code. The compiler needs to be aware of the instruction set format and be able to compile to them. A "just in time" virtual machine may also need to know the instruction set format and how to compile and map to it. It can also be compiled as a fat binary with multiple selectable instruction set formats.

In step 220, a determination as to whether the instruction is for the enabled alternate instruction is determined. For example, an incoming alternate instruction set instruction may include a flag or other identifier. In another embodiment, it may have a different format. In another embodiment, it may have a different processor mode or address mode. Other ways of identifying alternate instructions may be used as is necessary and/or desired.

In step 225, if the instruction is for the enabled alternate instruction set, the alternate instruction set map may translate the issued instruction to a CPU instruction for execution by the CPU. In another embodiment, the alternate instruction set instruction may be decoded.

In step 230, the CPU may execute the translated/decoded instruction.

In step 235, if the instruction is not in the enabled alternate instruction set, an alternate action may take place. For example, the instruction may be blocked from execution. In another embodiment, a non-alternate instruction set instruction may be translated into a harmless instruction, such as a no operation ("nop") instruction. On another embodiment, the instruction may generate a CPU exception and trap to the operating system or software exception handler.

In another embodiment, the instruction may generate a CPU fault, a CPU error, may cause the restart of a computer, etc. The CPU may also provide other error handlers for the invalid exception including status registers for the invalid instruction exception.

In one embodiment, additional actions may be taken in response to a non-alternate instruction set being issued. This may indicate a virus or an unauthorized program. For example, the CPU may take one or more of the following actions: it may disable non alternate or fixed instruction sets from executing; it may change the processor state to use a different instruction set or to a different alternate instruction set; it may restart a virtual machine under a different alternate instruction set; it may recompile the "just in time" code to a different alternate instruction set under a computer language virtual machine; it may restart a virtual machine container with a different lower permission alternate instruction with fewer capabilities and a partial instruction set list, disable an alternate instruction set or alternate instruction set group list from executing (e.g., an alternate instruction set can be enabled or disabled within the CPU translation list or CPU map list), disable the CPU standard instruction set or replace it with a lower permission and partially assigned instruction set; it may stop the program from executing non approved code or use whitelisting of approved software programs that can run under the alternate instruction set; it may blacklist a non-approved program and disable it from running on servers within a network; it may isolate a machine from the network; it may restart a computer with an alternate instruction set; it may provide the antivirus software with the alternate instruction parameters set to check for viruses running under alternate instruction sets; it may sandbox alternate instruction sets or code that runs within them to prevent invalid operations; it may decrease/eliminate network connectivity; it may disable disk and memory writing; it may transmit one or more notifications/reports may be issued; etc.

In one embodiment, a networked processor may take one or more of the actions in response to a notification received from the CPU.

In one embodiment, two or more different instruction sets architectures, such as x86 or Arm or Sparc within a 32-bit or 64-bit or larger instruction set op code list, may be enabled concurrently. The instruction may be assigned within different alternate instruction lists, such as instruction set number 102002 for ARM, or instruction set number 3900 for x86.

Figure 3:
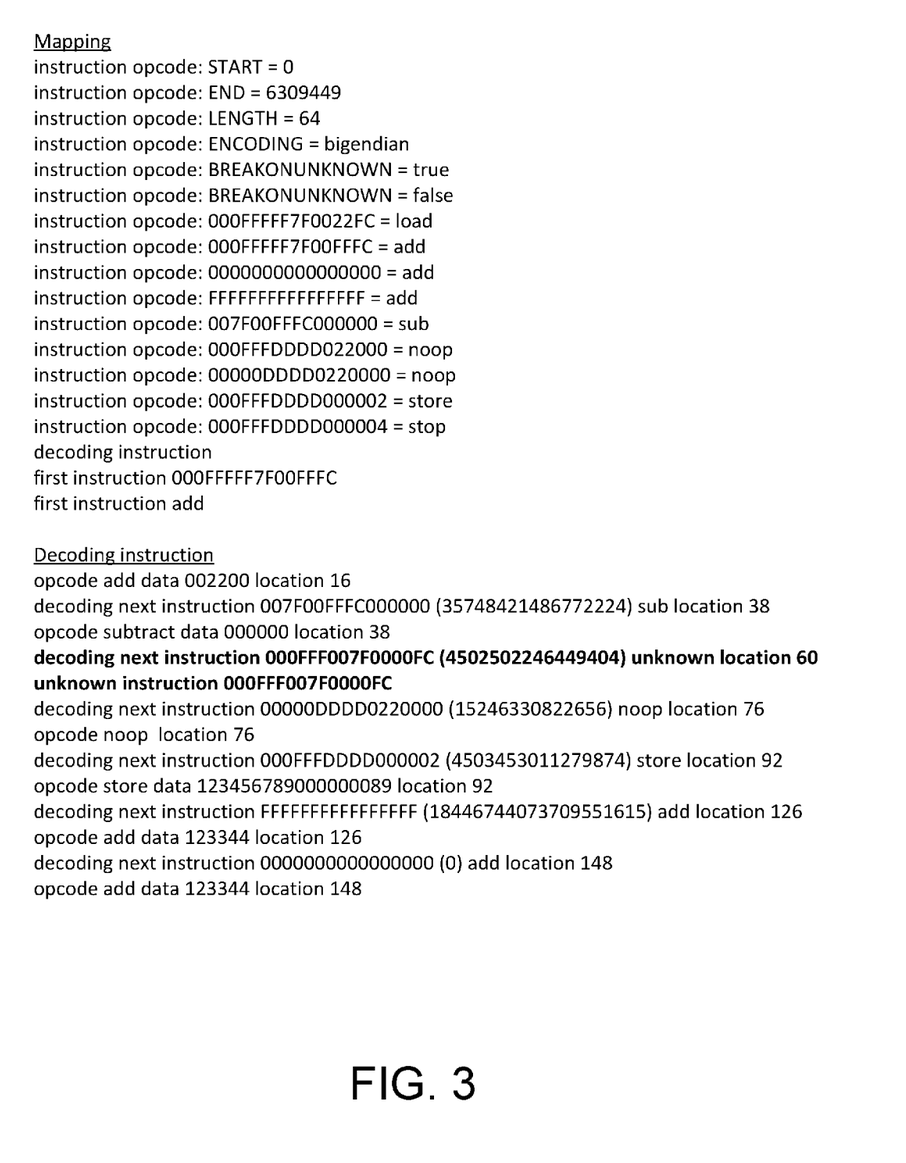
FIG. 3 depicts an illustrative example of an alternate instruction set with a 64-bit or variable length opcode according to one embodiment.
Figure 4:
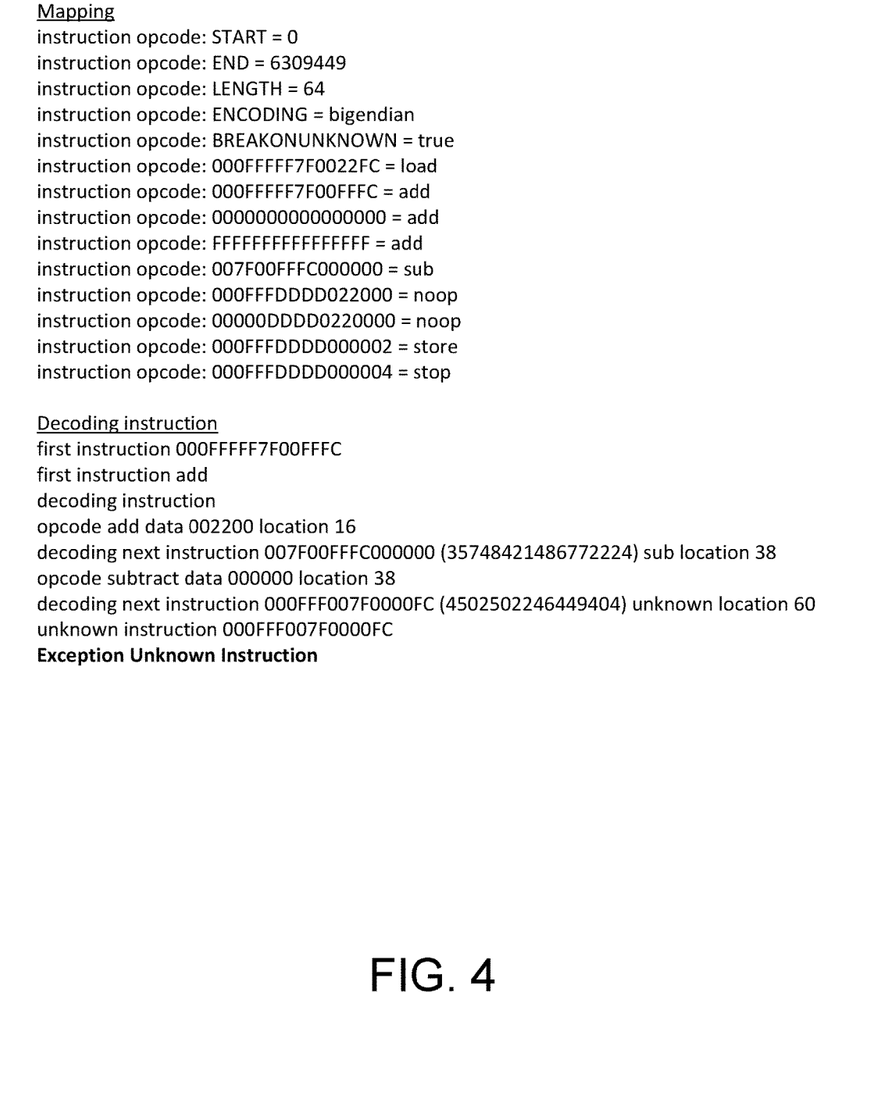
FIG. 4 depicts an illustrative example of an alternate instruction set generating an exception according to one embodiment.

Referring to FIGS. 3 and 4, non-limiting, illustrative examples of an instruction code map and a decoder according to embodiments are provided.

FIG. 3 is an illustrative example of an alternate instruction set with a 64-bit or variable length opcode according to one embodiment. The alternate instruction set is assigned to an add, a subtract, or other instructions, and the other instruction set parameters that may be applied within the map or alternate instruction translator, such as the byte format and opcode length (including whether it is fixed or variable size) which can be n-bits in addition to other parameters including code offset position. It also illustrates how the invalid instruction, which is an unassigned opcode number, is handled. Each instruction is assigned a corresponding number or value and an instruction operation type, such as an add or a subtract operation (instruction opcodes 0000000000000000 and FFFFFFFFFFFFFFFF are adds, while the hex code binary value 007F00FFFC000000 is a subtract). If the number is not assigned within the instruction space, it will generate an exception or a no operation within the processor.

In this example hexcode 000FFF007F0000FC and integer 4502502246449404 does not have an instruction assignment within a 64-bit unsigned integer space, and therefore generates a no operation instruction. Each instruction may have a key associated with an instruction type value. It can also provide an optional instruction set group list number set by an instruction, which may be a collection of bundles of instructions assigned to a group list. Invalid group list assignments for groups that do not exist may also generate an exception or no operation.

FIG. 4 is an illustrative example of an alternate instruction set generating an exception on invalid instruction opcodes that have no corresponding instruction type mapped for them and stop or discontinue processor execution according to one embodiment. There may also be a delay on an invalid instruction exception. In this example, if an opcode number, such as 64-bit hex code 000FFF007F0000FC and integer value (4502502246449404), does not have a assigned instruction, it generates a processor exception and program termination.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by an individual or individuals of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 10 operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for program execution using an alternate instruction set, comprising:
   enabling a computer processor to use an alternate instruction set, wherein each instruction in the alternate instruction set maps to a standard instruction for the computer processor;
   a first computer program in memory issuing a first instruction for execution by the computer processor;
   the computer processor determining that the first instruction issued by the first computer program is in the alternate instruction set;
   the computer processor translating the first instruction issued by the first computer program into the mapped standard instruction for the computer processor; and
   the computer processor executing the mapped standard instruction.

2. The method of claim 1, wherein a binary machine code disassembler disassembles the alternate instruction into assembly code, and the translated instruction comprises the assembly code.

3. The method of claim 1, wherein the step of enabling a computer processor to use an alternate instruction set comprises:
   an operating system bootloader loading the alternate instruction set to a memory.

4. The method of claim 3, wherein the memory is internal to the computer processor.

5. The method of claim 1, wherein a translation look-aside buffer translates the first instruction issued by the first computer program.

6. The method of claim 1, wherein the alternate instruction set comprises instructions have a different format from a standard instruction for the computer processor.

7. The method of claim 1, wherein the alternate instruction set instruction are executed in a different processor mode than a standard instruction for the computer processor.

8. The method of claim 1, wherein the alternate instruction set instruction are executed in a different address mode than a standard instruction set for the computer processor.

9. The method of claim 1, further comprising:
   the computer processor compiling the first computer program for the alternate instruction set.

10. The method of claim 9, further comprising:
   a second computer program in memory issuing a second instruction for execution by the computer processor;
   the computer processor determining that the second instruction issued by the computer program is not in the alternate instruction set; and
   the computer processor preventing the second instruction from executing.

11. The method of claim 10, further comprising:
   the computer processor executing a no operation in response to the second instruction not being in the alternate instruction set.

12. The method of claim 9, wherein the computer processor generates an exception in response to the second instruction not being in the alternate instruction set.

13. The method of claim 9, wherein the computer processor restarts the computer in response to the second instruction not being in the alternate instruction set.

14. A method for program execution using an alternate instruction set, comprising:
   enabling a computer processor to use an alternate instruction set, wherein each instruction in the alternate instruction set maps to a standard instruction for the computer processor;
   a computer program in memory issuing an instruction for execution by the computer processor;
   the computer processor determining that the instruction issued by the computer program is not in the alternate instruction set; and
   the computer processor preventing the instruction from executing.

15. The method of claim 14, further comprising:
   the computer processor executing a no operation in response to the second instruction not being in the alternate instruction set.

16. The method of claim 14, wherein the computer processor generates an exception in response to the second instruction not being in the alternate instruction set.

17. The method of claim 14, wherein the computer processor causes a computer associated with the computer processor to restart in response to the second instruction not being in the alternate instruction set.

18. The method of claim 14, wherein the computer processor enables a second alternate instruction set in response to the second instruction not being in the alternate instruction set.

19. The method of claim 14, wherein the computer processor changes a computer processor mode in response to the second instruction not being in the alternate instruction set.

20. The method of claim 1, wherein the instructions in the alternate instruction set are randomly mapped to the standard instructions for the computer processor.

* * * * *